US011102014B2

(12) United States Patent
Riyumkin et al.

(10) Patent No.: US 11,102,014 B2
(45) Date of Patent: Aug. 24, 2021

(54) METHOD FOR HANDLING DATA IN A SECURE CONTAINER

(71) Applicant: Safenet Inc., Belcamp, MD (US)

(72) Inventors: Dmitry Riyumkin, Kanata (CA); Darren Johnson, Ottawa (CA)

(73) Assignee: THALES DIS CPL CANADA, INC., Ottawa (CA)

( * ) Notice: Subject to any disclaimer, the term of this patent is extended or adjusted under 35 U.S.C. 154(b) by 387 days.

(21) Appl. No.: 16/262,261

(22) Filed: Jan. 30, 2019

(65) Prior Publication Data

US 2020/0244469 A1 Jul. 30, 2020

(51) Int. Cl.
| | |
|---|---|
| *H04L 29/06* | (2006.01) |
| *H04L 9/32* | (2006.01) |
| *G06F 21/60* | (2013.01) |
| *H04L 9/08* | (2006.01) |
| *H04L 9/14* | (2006.01) |

(52) U.S. Cl.
CPC .......... *H04L 9/3268* (2013.01); *G06F 21/602* (2013.01); *H04L 9/0891* (2013.01); *H04L 9/14* (2013.01)

(58) Field of Classification Search
None
See application file for complete search history.

(56) References Cited

U.S. PATENT DOCUMENTS

| 6,167,521 A | 12/2000 | Smith et al. | |
|---|---|---|---|
| 10,872,175 B2* | 12/2020 | Leiserson | ............. G06F 3/0634 |
| 2005/0182948 A1* | 8/2005 | Ducharme | ............. G06F 21/10 |
| | | | 713/189 |
| 2015/0143136 A1* | 5/2015 | Barney | ..................... H04L 9/14 |
| | | | 713/193 |
| 2015/0154031 A1* | 6/2015 | Lewis | .................. G06F 9/4406 |
| | | | 713/2 |

OTHER PUBLICATIONS

Goldman et al., "Matchbox: Secure Data Sharing", IEEE Internet Computing, Institute of Electrical and Electronics Engineers, US, vol. 8, No. 6, Nov. 1, 2004, pp. 18-24.

(Continued)

*Primary Examiner* — Andrew J Steinle
(74) *Attorney, Agent, or Firm* — Buchanan Ingersoll & Rooney PC

(57) ABSTRACT

The invention is a method for handling data in a secure container comprising first and second private keys uniquely allocated to the secure container. The secure container is configured to use the first private key to handle said data in a first operating mode and to use the second private key to handle said data in a second operating mode. The secure container is configured to prevent the update of the first private key after its clearing. The method comprises the step of automatically clearing the first private key in response to a request for enabling a software module in the second operating mode and a step of automatically using the first operating mode by the secure container if the first private key has not been cleared and of automatically using the second operating mode by the secure container if the first private key has been cleared.

15 Claims, 2 Drawing Sheets

(56) References Cited

OTHER PUBLICATIONS

Cachin et al., "Policy-Based Secure Deletion", Computer & Communications Security, ACM, 2 Penn Plaza, Suite 701 New York NY 10121-0701 USA, Nov. 4, 2013, pp. 259-270.
Notification of Transmittal of the International Search Report and the Written Opinion of the International Searching Authority (Forms PCT/ISA/220, PCT/ISA/210, and PCT/ISA/237) dated Jun. 3, 2020, in corresponding International Application No. PCT/US2020/015318. (14 pages).

* cited by examiner

METHOD FOR HANDLING DATA IN A SECURE CONTAINER

FIELD OF THE INVENTION

The present invention relates to methods for handling data in a secure container. It relates particularly to methods of securely handling data in a container secured thanks to a secret value.

BACKGROUND OF THE INVENTION

Hardware Security Modules (HSM) are hardware computing devices which safeguards and manages secret data like digital keys and provide crypto-processing features. They are specifically designed for the protection of the crypto key lifecycle. HSMs are hardened and tamper-resistant devices that allow to securely manage, process and store cryptographic keys.

A HSM allows loading and executing third party provided executable codes (i.e. software modules commonly known as Functional Modules or FMs).

It can happen that a malicious FM is installed into a HSM and is designed to try to attack the HSM from inside. The HSM design can take certain steps to protect the HSM core from FMs by, for example, executing the FM code inside some kind of a secure sandbox but, in general, it is very hard to guarantee that FMs will never be able to break out of the sandbox.

Consequently, once a FM has been installed in a HSM, this HSM may be considered as compromised for services requiring a high security level. It is to be noted that a malicious FM, which manages to break out of the sandbox, can permanently modify the HSM state so that the HSM is left compromised even after the FM is deleted. Consequently, it is very difficult to guarantee that a HSM is safe. This issue is especially important in the service provider (SP) environments based on a HSM-as-a-Service model.

There is a need to mitigate security risks for a secure container like a HSM.

SUMMARY OF THE INVENTION

The invention aims at solving the above mentioned technical problem.

An object of the present invention is a system including a secure container, a processor and a memory. The secure container comprises first and second private keys (31, 32) uniquely allocated to the secure container. The memory comprises a first set of instructions that, when executed by the processor, cause the secure container to use the second private key to handle data in a second operating mode and to use the first private key to handle data in a first operating mode. The memory comprises a second set of instructions that, when executed by the processor, cause the secure container to automatically clear the first private key in response to a request for enabling a software module in the second operating mode. The secure container is configured to prevent the update of the first private key after the first private key has been cleared (i.e. after its clearing). The secure container is configured to automatically use the first operating mode if the first private key has not been cleared and to automatically use the second operating mode if the first private key has been cleared.

Advantageously, the secure container may comprise a first certificate corresponding to the first private key and a second certificate corresponding to the second private key. Said first and second certificates may be uniquely allocated to the secure container. The first set of instructions, when executed by the processor, may cause the secure container to use the second private key and the second certificate to handle data in the second operating mode and to use the first private key and the first certificate to handle data in the first operating mode.

Advantageously, the first certificate may have a first certificate attribute and said second certificate may have a second certificate attribute and said first and second certificate attributes may have different values.

Advantageously, the secure container may comprise a third private key uniquely allocated to the secure container. The first set of instructions, when executed by the processor, may cause the secure container to use said third private key to handle data in a third operating mode. The memory may comprise a second set of instructions that, when executed by the processor, cause said secure container to automatically clear the second private key and the first private key if still present in response to a request for enabling a software entity in the third operating mode. The secure container may be configured to prevent the update of the second private key after its clearing.

Advantageously, the secure container may be configured to automatically use the second operating mode if the first private key has been cleared and if the second private key has not been cleared, and to automatically use the third operating mode if said first and second private keys have been cleared.

Advantageously, the secure container may comprise first, second and third certificates, each of said certificates having its own certificate attribute and being uniquely allocated to the secure container. Certificate attributes of said first, second and third certificates may have different values. The first set of instructions, when executed by the processor, may cause the secure container to use the third private key and the third certificate to handle data in the third operating mode, to use the second private key and the second certificate to handle data in the second operating mode and to use the first private key and the first certificate to handle data in the first operating mode.

Advantageously, the enabling of the software module may be the downloading, the installation or the activation of the software module in the secure container.

Advantageously, the secure container may include a configuration parameter and the enabling of the software module may be the setting of the configuration parameter for allowing the downloading, the installation or the activation of the software module in the secure container.

Advantageously, the secure container may be a hardware security module, a Software Security Module, a secure mobile phone, a smart card, a secure element or a secure IoT device.

Another object of the invention is a computer-implemented method for handling data in a secure container included in a system. The secure container comprises first and second private keys uniquely allocated to the secure container. The secure container is configured to use the first private key to handle said data in a first operating mode and to use the second private key to handle said data in a second operating mode. The method comprises the step of automatically clearing the first private key in response to a request for enabling a software module in the second operating mode. The method comprises the step of automatically using the first operating mode by the secure container if the first private key has not been cleared and of automatically using the second operating mode by the secure container if the first private key has been cleared. The secure container is configured to prevent the update of the first private key after its clearing.

Advantageously, the secure container may comprise a first certificate corresponding to the first private key and a second certificate corresponding to the second private key. Said first and second certificates may be uniquely allocated to the secure container. The secure container may use the second private key and the second certificate to handle data in the second operating mode and may use the first private key and the first certificate to handle data in the first operating mode.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of system comprising a secure container secured by using a secret value stored in the container itself. It is well-suited for systems including a hardware secure container like a hardware security module (HSM), a secure mobile phone, a smart card, a secure element or a secure IoT (Internet-of-Things) device. The invention also applies to Software Security Modules which are secure containers hosted into a secure hardware platform.

Figure 1:
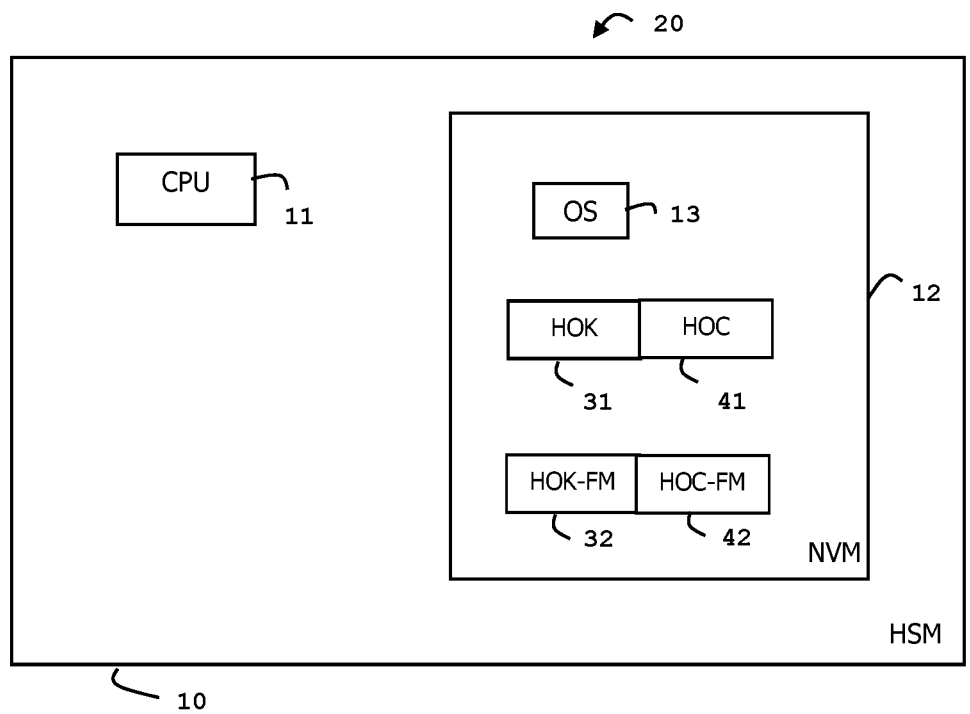
FIG. 1 is a first example of architecture of a system including a secure container according to the invention.

FIG. 1 shows an example of architecture of system including a secure container according to the invention.

In this example, the system 20 is a computer machine including a secure container 10 of HSM type. The hardware security module 10 comprises a central processing unit (CPU) 11 and a non-volatile memory (NVM) 12. The CPU can be implemented with any appropriate processor or coprocessor providing cryptographic function.

The HSM 10 comprises an operating system (OS) 13 and two sets of device keys/certificates stored in the non-volatile memory 12 and uniquely allocated to the HSM 10. Thus, each of these sets can be used to identify the HSM 10 among a large number of other HSMs. The operating system 13 includes several instructions intended to be executed by the CPU 11 for operating the HSM.

The first set of device keys/certificates includes a first private key 31 (also named HOK for Hardware Origin Private Key) and a first certificate 41 (also named HOC for Hardware Origin Public Key Certificate). The second set of device keys/certificates includes a second private key 32 (also named HOK-FM for Hardware Origin Private Key-Functional Module) and a second certificate 42 (also named HOC-FM for Hardware Origin Public Key Certificate-Functional Module).

The operating system 13 is configured to use the first private key 31 to handle data in a first operating mode (also named HOK mode or super secure mode) and to use the second private key 32 to handle data in a second operating mode (also named HOK-FM mode or secure mode) when running the HSM.

More precisely, only one operating mode can be activated at a given time in the secure container 10. Thus, when handling data, the HSM is either in first operating mode or second operating mode.

The data handled by the secure container may be data internally managed by the HSM (like secret keys, cryptographic seeds, passwords and certificates for instance) or a data used when communicating with an external entity like another secure container, a remote computer or a user's device for example.

In addition to being secure container-specific, the first private key (HOK) 31 is specific to the first operating mode while the second private key (HOK-FM) 32 is specific to the second operating mode. (The same for certificates when existing.) Preferably the two sets are initialized during the manufacturing stage of the HSM 10.

In one embodiment, the two sets only include the private keys (no certificate).

The operating system 13 is configured to automatically clear the first private key 31 in response to a request for enabling a software module (like a Functional Module also called FM) intended to be executed in the second operating mode. In other word, the very first time a request for enabling a software module targeting the second operating mode is identified in the HSM 10, the value of the first private key 31 is wiped out (e.g. zeroized for instance).

The operating system 13 can also erase the first certificate 41 at the same time as the first private key 31 is erased.

Advantageously, the clearing of the first private key 31 is carried out in a secure manner for example by several overwriting operations performed in atomic manner so that the initial value cannot be retrieved thanks to remnant physical signals.

Preferably the first private key 31 is erased before a possible loading of the software module into the HSM.

The secure container is configured to prevent the update of the first private key 31 after the first private key has been cleared.

The secure container (HSM) can detect that the first private key has been cleared by checking an associated flag (assumed to have been set to a preset value during the clearing) or by comparing the value of the first private key with a preset reference value.

The first private key can be stored in a predefined location of NVM. Clearing can be zeroization so the firmware (operating system) recognizes that the key has been cleared if it is all zeros. There can also be a logic to handle a partial clearance, which may happen if power cycle happens halfway through the zeroization process.

Preferably, private keys (e.g. HOK, HOK-FM) are provisioned into a HW-based secure container during the manufacturing process at the factory using special manufacturing tools and special manufacturing firmware. In one embodiment, the firmware (operating system embedded in the shipped secure container) is devoid of any logic, which can update (except clearing) any of the first and second private keys (and their respective certificates when present). Consequently attempts to update the private keys are not possible.

Consequently, the clearing of the first private key is irreversible while the HSM remains deployed on the field.

The operating system of the secure container 10 is adapted to automatically use the first operating mode if the first private key 31 has not been cleared and to automatically use the second operating mode if the first private key has been cleared. Thus when both first and second private keys are available, the secure container 10 ignores the second private key and uses the first operating mode only.

It is to be noted that the situation where the first private key is present (not cleared) and the second private key is absent (cleared) is not possible for a HSM configured according to the invention.

As explained above, the secure container 10 is configured to automatically clear the first private key 31 in response to a request aiming at enabling a software module intended to be executed in the second operating mode. The event corresponding to the enabling of a software module can be the downloading, the installation or the activation of the software module in the secure container 10.

Advantageously, the secure container 10 can include at least one configuration parameter. The event corresponding to the enabling of a software module can be the setting of a configuration parameter that allows the downloading, the installation or the activation of the software module in the secure container. Such configuration parameter can be implemented as a flag for instance.

Preferably, said first and second certificates are signed by a Certificate Authority (CA). For example, they may be signed by the Manufacturer CA during the manufacturing phase at the factory. This way, the sets (private key/certificate) can be used to prove that the HSM is a genuine one.

Preferably, said first and second certificate have their own certificate attributes which have different values. Thus these certificates are easily distinguishable from outside the secure container and allows a third party (i.e. applications, IT devices, other HSMs) interacting with the secure container 10 and to know the current operating mode of the secure container 10.

For example, a client application may ask for a proof-of-identity by sending a challenge to the secure container and the secure container signing the challenge with either the first private key (if in the super secure mode) or second private key (if in the secure mode) and then sending back the signed challenge along with either first or second certificate. The client application then needs to be able to look at the certificate received from the secure container and unambiguously say whether this certificate is the first or second certificate. For instance, said first and second certificates may be created with different certificate attributes (vendor-specific certificate extensions).

Figure 2:
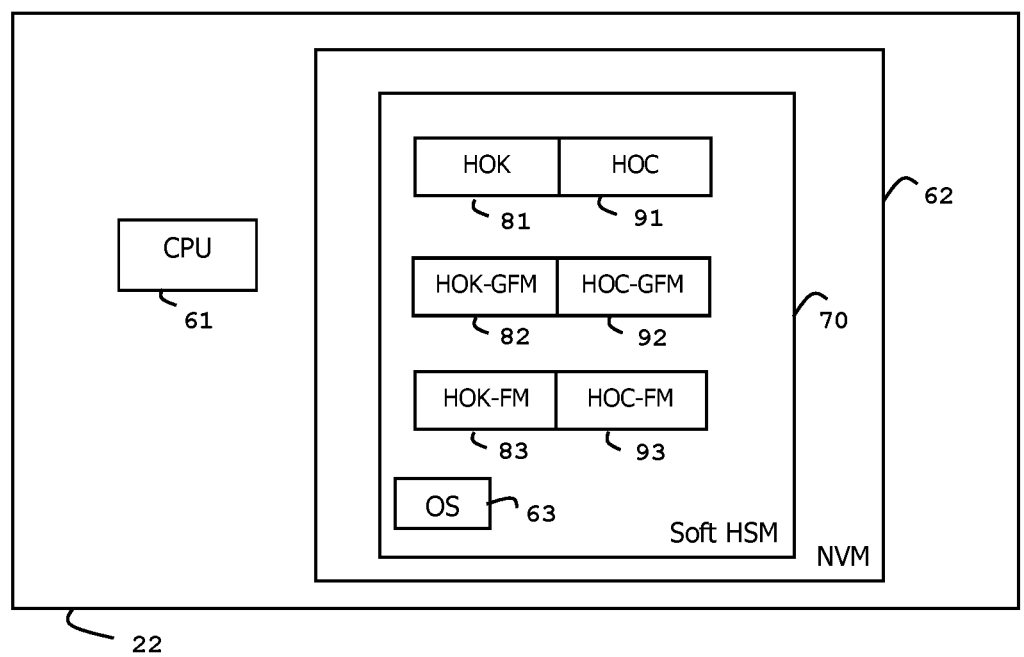
FIG. 2 is a second example of architecture of a system including a secure container according to the invention.

FIG. 2 shows a second example of architecture of system including a secure container according to the invention.

In this example, the system 22 is a hardware server comprising a processing unit (CPU) 61 and a non-volatile memory 62. The system 22 hosts a secure container 70 which is a software security module. The software security module 70 is stored in the non-volatile memory 62.

The software security module 70 comprises an operating system (OS) 63 and three sets of device keys/certificates which are uniquely allocated to the secure container 70.

The first set of device keys/certificates includes a first private key 81 (also named HOK) and a first certificate 91 (also named HOC).

The second set of device keys/certificates includes a second private key 82 (also named HOK-GFM) and a second certificate 92 (also named HOC-GFM).

The third set of device keys/certificates includes a third private key 83 (also named HOK-FM) and a third certificate 93 (also named HOC-FM).

The operating system 63 is configured to use the first private key 81 to handle data in a first operating mode (also named HOK mode or super secure mode), to use the second private key 82 to handle data in a second operating mode (also named HOK-GFM mode or very secure mode) and to use the third private key 83 to handle data in a third operating mode (also named HOK-FM mode or secure mode) when running the secure container.

In one embodiment, the three sets only include the private keys (no certificate).

The operating system 63 is configured to automatically clear the first private key 31 in response to a request for enabling a software module intended to be executed in either the second operating mode or the third operating mode.

The operating system 63 is also configured to automatically clear the second private key in response to a request for enabling a software entity (i.e. software module) intended to be executed in the third operating mode.

Preferably, the secure container detects that a software module is intended to be executed in the second operating mode if the software module has been certified by an authority belonging to a predefined list. The secure container treats all other software modules (not certified by an authority from the predefined list) as intended to be executed in the third operating mode.

The operating system 63 can also erase the certificate associated to a private key at the same time as the private key is wiped out.

The secure container is designed to prevent the update of first and second private key after they have been cleared.

The secure container can detect that the first private key has been cleared by checking an associated flag (assumed to have been set to a preset value during the clearing) or by comparing the value of the first private key with a preset reference value.

In the Soft HSM (soft security module) case, the invention protects the organization running Soft HSMs and good users of Soft HSMs against bad users of Soft HSMs trying to use malicious FMs to attack the Soft HSM from inside. The bad FMs run by the bad users could compromise the Soft HSM. When the organization running Soft HSM provisions it with the first private key (HOK), it "certifies" that Soft HSM as super secure. Updating the potentially compromised Soft HSM with the first private key (HOK) would mean "certifying" the compromised soft HSM as super secure. The three couples private key/certificate (HOK/HOC, HOK-GFM/HOC-GFM, and HOK-FM/HOC-FM) are provisioned when an instance of the Soft HSM is created. The software logic inside the Soft HSM controls such provisioning. That logic will refuse provisioning the first private key (HOK) if the second (HOK-GFM) and/or the third private key (HOK-FM) are present.

It is to be noted that private keys (and associated certificates) have to be provisioned for each instance of Soft secure container when such an instance is created (for example each instance may be implemented as a Docker container). The allocation of a value (preferably randomly generated) to each private key is done in a secure premise where the Soft secure container environment is deployed. The associated certificates can be signed by the CA of the organization running the instances of Soft secure containers.

It is important that each secure container has unique private keys. Security of Soft secure container relies on security of its environment. So, the organization running Soft secure containers must be responsible for providing a secure environment, which includes following policies such as not copying Soft secure container instances.

Consequently, the clearing of the first and second private keys is irreversible while the secure container 70 remains deployed on the field.

The operating system of the secure container is adapted to automatically use the first operating mode if the first private key 81 has not been cleared, to automatically use the second operating mode if the first private key 81 has been cleared and the second private key 82 has not been cleared and to automatically use the second operating mode if both first and second private keys have been cleared.

Events corresponding to the enabling of a software module can be similar to those described at FIG. 1.

Advantageously, the secure container can include two configuration parameters: a first parameter dedicated to enable the very secure operating mode and a second parameter dedicated to enable the secure operating mode. The event corresponding to the enabling of a software module can be the setting of a configuration parameter that allows the downloading, the installation or the activation of the software module in the secure container.

The invention is not limited to secure containers having two or three privates keys associated to as many operating modes. The invention applies to any secure containers comprising several privates keys associated to as many operating modes.

Thanks to the invention, a hierarchy of operating modes can be set in a secure container. The operating mode having the highest security level is automatically selected and used based on the checking of the existence of its associated private key. As soon as a software module is intended to become available for a targeted operating mode having a security level lower than the current one, all operating modes having a security level higher than the security level of the targeted operating mode are permanently deactivated by clearing their allocated private keys.

In the example of FIG. 2, a hierarchy of three operating modes has been created. From the highest security level to the lowest security level: a super operating mode (linked to the first private key 81), a very operating mode (linked to the second private key 82) and a secure operating mode (linked to the third private key 83). Thanks to the invention the best security level is automatically selected when running the secure container. Thanks to the invention the best available operating mode(s) can be permanently deactivated without possibility to come back while the secure container remains deployed on the field.

When an operating mode is selected, the secure container handles all data and transactions using the private key (and certificate if any) allocated to the selected operating mode. Thus the secure container can manage:

- Application requests aiming at verifying the origin/type/identity of the secure container.
- Establishment of trusted paths between HSMs and applications,
- Establishment of secure channels between HSMs and other IT devices (e.g., smart cards, backup devices, PIN Entry devices, etc.)
- Key establishment and other cryptographic protocols (inter-HSM or between HSMs and other IT devices.

Figure 3:
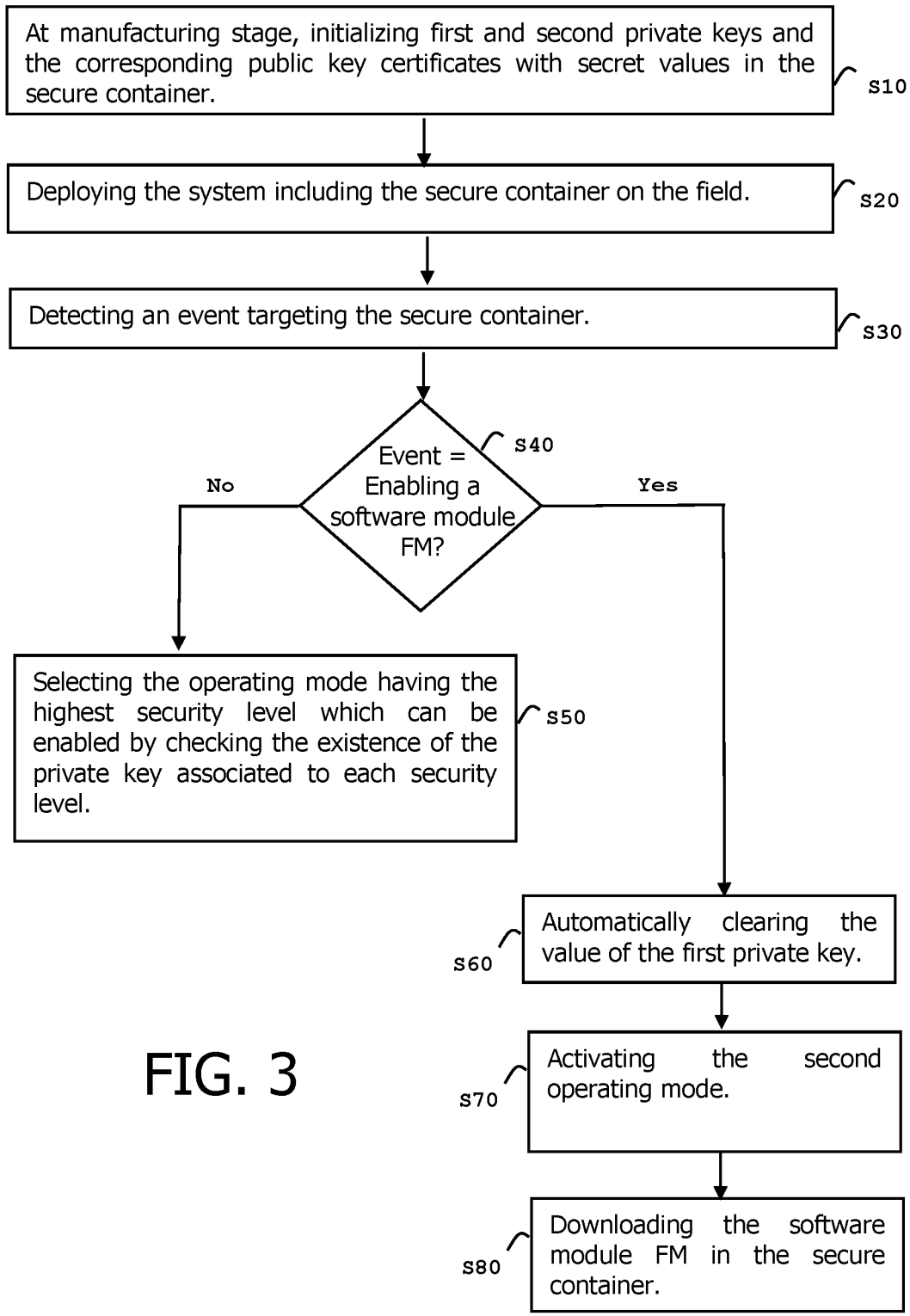
FIG. 3 depicts a flow chart for securely handling data in a secure container according to an example of the invention.

FIG. 3 shows a flow chart for securely handling data in a secure container according to an example of the invention.

In this example, the secure container is similar to the one described at FIG. 1.

At step S10, during the manufacturing stage, first and second private keys 31 and 32 and the corresponding public key certificates 41 and 42 are initialized with secret values in the secure container.

At step S20, a system comprising the secure container is deployed on the field. Note that the system can be the secure container itself.

At step S30, an event targeting the secure container occurs and is detected by the secure container. The event may be a message received by the secure container from an external entity or an internal action triggered by the secure container itself.

In one embodiment, the received message may contain a command aiming at downloading a new software application in the secure container or aiming at setting an internal configuration parameter reflecting the authorization to download or install a new software application in the secure container.

In one embodiment, the internal action may be the setting of an irreversible configuration parameter (internal to the secure container) reflecting the authorization to download or install a new software application in the secure container. The internal action can be triggered by a preset date/time or a predefined number of reboots of the secure container for instance.

In one embodiment, the internal action may be the activation of a Functional module pre-installed in the secure container when a preset threshold is reached.

At step S40, the secure container checks if the event aims at enabling a software module in the secure container. IF yes, the secure container automatically clears the value of the private keys 31 at step S60 and activates the second operating mode at step S70.

Advantageously, the secure container may also check whether the software module is trusted or certified to adapt the target operating mode at step S40.

At step S80, the secure container can download the software module in the secure container. (In case the secure container received a message aiming at downloading a new software application.)

It is to be noted that steps S60 and S70 can be merged in a single atomic step.

Coming back to step S40, if the detected event does not aim at enabling a software module in the secure container, the secure container automatically selects the operating mode having the highest security level which can be enabled by checking the existence of the private keys associated to each security levels at step S50. For example, the secure container checks the existence of the private key 31. If the private key 31 has not been cleared, the secure container applies the first operating mode else it applies the second operating mode.

By reference to the secure container described at FIG. 2, the secure container 70 can be configured to manage additional combinations and additional changes of operating mode.

Assuming the three private keys 81, 82 and 83 are still present (not cleared), the secure container automatically works in the first operating mode which uses the first private key 81 (HOK) by default.

A first path can be followed for the change of operating modes.

While in the first operating mode (super secure mode), a customer requests to enable a trusted (i.e. certified) FM. In response to that request, the first private key (HOK) is cleared but second and third private keys (HOK-GFM and HOK-FM) stay. The secure container switches to the second operating mode (very secure mode) where second and third private keys are present but only the second private key (HOK-GFM) is used.

While in the second operating mode, a new customer requests to enable a regular FM (i.e. neither certified nor trusted). In response to that request, the second private key (HOK-GFM) is cleared and only the third private key remains present in the secure container. From this point, the secure container works in the third operating mode by using the third private key. Starting from the configuration where the three private keys 81, 82 and 83 are not cleared, a second path can be followed for the change of operating modes.

While in the first operating mode, a customer requests to enable a regular FM (not certified/trusted). In response to that request, both the first and second private key (HOK and HOK-GFM) are cleared and only the third private key (HOK-FM) remains present in the secure container. From this point, the secure container works in the third operating mode by using the third private key.

The private keys embedded in the secure container can be used to prove to the outside world that the secure container is a genuine secure container having a guaranteed level of security. For instance the second private key can be used to prove that the secure container is a genuine "very secure" HSM and the third private key can be used to prove that the secure container is a genuine "secure" HSM. The transitions are authorized only to a less secure operating mode. In the lowest secure mode (third operating mode), a "run-away" FM could permanently compromise the HSM. Thanks to the invention, the "run-away" FM cannot restore the initial value of the first and second private keys and cannot come back to a more secure operating mode.

When the HSM is asked to prove to an outside party (a client application, IT device, another HSM, etc.) that it is a genuine "super secure" HSM, it signs some data provided by that outside party with the first private key (HOK) and sends that signed data together with the corresponding certificate (HOC) to the outside party. The outside party then verifies the signed data using the certificate received together with the signed data and can verify this certificate (HOC) against the Manufacturing CA root public key. So, there is a cryptographic proof that the HSM, which signed the data is in a possession of the first private key (HOK), who's associated certificate (HOC) was signed at the Manufacturer factory, which means that the HSM is a genuine Manufacturer HSM.

Thanks to the invention a malevolent FM cannot stole the first and second private keys (HOK/HOK-GFM) and thus cannot start impersonating legitimate HSMs by manufacturing a bunch of HW fakes or putting a piece of software in the network pretending to be a real super secure or very secure HSM.

The invention allows to protect any party communicating with the secure container (like a customer application, IT device or another HSM.) from a possibility that the secure container in question has been compromised by a malicious FM but poses as a good more secure container.

Thanks to the invention, other parties communicating with the secure container can unambiguously distinguish between more secure level and less secure level provided by the secure container even if the secure container is compromised and tries to pose as more secure level secure container. It allows to prevent malevolent entities to impersonate more secure level genuine secure containers.

It must be understood, within the scope of the invention, that the above-described embodiments are provided as non-limitative examples. In particular, the features described in the presented embodiments and examples may be combined.

For instance, a hardware secure container can manage three or more operating modes and as many couples private key/public key certificate.

The invention allows to reduce the risk of the secret value being leaked or dumped out of the secure container when a software module is enabled in the secure container.

The architectures of the systems and secure containers shown at FIGS. 1 and 2 are provided as examples only. These architectures may be different. For example, the secure container may include Functional modules (software services) pre-installed in non-volatile memory.

Although described in the framework of a HSM equipment, the invention also applies to any type of secure containers.

The invention claimed is:

1. A system including a secure container, a processor and a memory,
   wherein the secure container comprises first and second private keys uniquely allocated to the secure container,
   wherein the memory comprises a first set of instructions that, when executed by the processor, cause said secure container to use the second private key to handle data in a second operating mode and to use the first private key to handle data in a first operating mode,
   wherein the memory comprises a second set of instructions that, when executed by the processor, cause said secure container to automatically clear the first private key in response to a request for enabling a software module in the second operating mode, wherein the secure container is configured to prevent the update of the first private key after its clearing and wherein the secure container is configured to automatically use the first operating mode when the first private key has not been cleared and to automatically use the second operating mode when the first private key has been cleared.

2. The system according to claim 1, wherein the secure container comprises a first certificate corresponding to the first private key and a second certificate corresponding to the second private key, wherein said first and second certificates are uniquely allocated to the secure container and wherein the first set of instructions, when executed by the processor, cause said secure container to use the second private key and the second certificate to handle data in the second operating mode and to use the first private key and the first certificate to handle data in the first operating mode.

3. The system according to claim 2, wherein said first certificate has a first certificate attribute and said second certificate has a second certificate attribute and wherein said first and second certificate attributes have different values.

4. The system according to claim 1, wherein the secure container comprises a third private key uniquely allocated to the secure container,
   wherein the first set of instructions, when executed by the processor, cause said secure container to use said third private key to handle data in a third operating mode,
   wherein the memory comprises a second set of instructions that, when executed by the processor, cause said secure container to automatically clear the second private key and the first private key if still present in response to a request for enabling a software entity in the third operating mode, and wherein the secure container is configured to prevent the update of the second private key after its clearing.

5. The system according to claim 4, wherein the secure container is configured to automatically use the second operating mode if the first private key has been cleared and the second private key has not been cleared, and to automatically use the third operating mode if said first and second private keys have been cleared.

6. The system according to claim 4, wherein the secure container comprises first, second and third certificates, each of said certificates having its own certificate attribute and being uniquely allocated to the secure container, wherein certificate attributes of said first, second and third certificates have different values, and wherein the first set of instructions, when executed by the processor, cause said secure container to use the third private key and the third certificate to handle data in the third operating mode, to use the second private key and the second certificate to handle data in the second operating mode and to use the first private key and the first certificate to handle data in the first operating mode.

7. The system according to claim 1, wherein the enabling of the software module is the downloading, the installation or the activation of the software module in the secure container.

8. The system according to claim 1, wherein the secure container includes a configuration parameter and wherein the enabling of the software module is the setting of the configuration parameter allowing the downloading, the installation or the activation of the software module in the secure container.

9. The system according to claim 1, wherein the secure container is a hardware security module, a Software Security Module, a secure mobile phone, a smart card, a secure element or a secure IoT device.

10. A computer-implemented method for handling data in a secure container included in a system,
wherein the secure container comprises first and second private keys uniquely allocated to the secure container,
wherein the secure container is configured to use the first private key to handle said data in a first operating mode and to use the second private key to handle said data in a second operating mode,
wherein the method comprises the step of automatically clearing the first private key in response to a request for enabling a software module (FM) in the second operating mode,
wherein the method comprises the step of automatically using the first operating mode by the secure container when the first private key has not been cleared and of automatically using the second operating mode by the secure container when the first private key has been cleared, and wherein the secure container is configured to prevent the update of the first private key after its clearing.

11. The method according to claim 10, wherein the secure container comprises a first certificate corresponding to the first private key and a second certificate corresponding to the second private key, wherein said first and second certificates are uniquely allocated to the secure container and wherein said secure container uses the second private key and the second certificate to handle data in the second operating mode and uses the first private key and the first certificate to handle data in the first operating mode.

12. The method according to claim 11, wherein said first certificate has a first certificate attribute and said second certificate has a second certificate attribute and wherein said first and second certificate attributes have different values.

13. The method according to claim 10, wherein the enabling of the software module is the downloading, the installation or the activation of the software module in the secure container.

14. The method according to claim 10, wherein the secure container includes a configuration parameter and wherein the enabling of the software module is the setting of the configuration parameter allowing the downloading, the installation or the activation of the software module in the secure container.

15. The method according to claim 10, wherein the secure container is a hardware security module, a Software Security Module, a secure mobile phone, a smart card, a secure element or a secure IoT device.

* * * * *